United States Patent [19]

Wood

[11] 4,070,425
[45] Jan. 24, 1978

[54] POLYAMIDE GEL REMOVAL

[75] Inventor: T. A. Wood, Lehigh Acres, Fla.

[73] Assignee: E. I. Du Pont de Nemours and Company, Wilmington, Del.

[21] Appl. No.: 660,853

[22] Filed: Feb. 24, 1976

[51] Int. Cl.$^2$ .......................... B29C 29/00; B08B 3/08
[52] U.S. Cl. ........................................ 264/39; 134/3; 134/2.2 R; 134/38; 260/33.4 R; 264/83; 264/169; 264/340
[58] Field of Search ................. 264/340, 39, 169–170, 264/83; 134/3, 22 R, 38; 260/33.4 R

[56] References Cited

U.S. PATENT DOCUMENTS

| 2,907,687 | 10/1959 | Scigliano | 134/22 R |
|---|---|---|---|
| 3,070,548 | 12/1962 | Brooke | 134/22 R |
| 3,236,894 | 2/1968 | England | 260/574 |
| 3,245,944 | 4/1966 | Middleton | 260/33.4 R |
| 3,324,185 | 6/1967 | Gilbert et al. | 260/618 D |
| 3,553,144 | 1/1971 | Murphy | 134/38 |
| 3,660,160 | 5/1972 | Powers et al. | 134/22 R |
| 3,669,740 | 6/1972 | Yamamoto et al. | 134/22 R |
| 3,904,430 | 9/1975 | Tipping et al. | 134/38 |

FOREIGN PATENT DOCUMENTS

| 1,143,375 | 2/1963 | Germany. |
|---|---|---|
| 964,755 | 7/1964 | United Kingdom. |

OTHER PUBLICATIONS

Nylon Technology–Inderfurth–N.Y., N.Y., McGraw–Hill Book Company–1953, p. 32.
Journal of the American Chemical Society, vol. 86, 1964, Hydrogen Bonding in Fluoro Alcohols–Middleton et al., pp. 4948–4952.

*Primary Examiner*—Jeffery R. Thurlow

[57] ABSTRACT

Gelled polyamides are contacted with organic hydroxyl group-containing compounds to so modify the physical nature of the gels as to permit their flushing from process equipment.

12 Claims, No Drawings

POLYAMIDE GEL REMOVAL

BACKGROUND OF THE INVENTION

Polyamides are often used in the form of nylon fibers, coatings or molded objects. The usual process for the manufacture of many polyamides involves heating the reactants under reduced pressure so as to remove water of reaction and force the amidation reaction to completion. The molten polymer so produced is then often maintained at elevated temperatures while it is mixed with additives.

Extended exposure to these elevated processing temperatures causes crosslinking of a part of the polyamide. Crosslinks convert the polymer into a gel which is insoluble in molten polymer and in all polymer solvents. Gel collects on the walls of the processing equipment, requiring periodic shut down of the equipment for its removal.

Various techniques have been used for the removal of this gel from the process equipment. The usual industrial method for doing this involves burning of the deposit from isolated equipment parts and mechanical removal but cutting or boring. Various other techniques have been proposed for the removal of polyamide gel without dismantling the equipment. For example, Yamamoto et al. in U.S. Pat. No. 3,669,740 suggested that degraded polymer be contacted at elevated temperatures with a carboxylic acid and optionally an organic hydroxy diluent. In addition, liquids such as the polyhalo alcohols taught by Middleton in U.S. Pat. No. 3,245,944 can be useful in loosening gelled polymer laminated with ungelled polymer, presumably because the latter material is dissolved away.

However, none of these techniques has proved entirely satisfactory, and the burning of deposits from isolated equipment parts and mechanical techniques has remained as the general industrial practice for removing gel.

SUMMARY OF THE INVENTION

The present invention provides a process whereby aliphatic polyamide gel is broken down into fragments which can be readily flushed from process equipment without its being dismantled.

Specifically, the instant invention comprises contacting an aliphatic polyamide gel at a temperature of about from 100° to 300° C. and for a period of about from 15 minutes to 12 hours with at least one compound having at least one alcoholic or phenolic hydroxyl group, the compound being liquid at the contact temperature and having a. an infrared absorption characterized by a wavelength difference of at least about 0.2 micron in hydroxyl group stretching frequency when measured in carbon tetrachloride and in tetrahydrofuran;

b. a normal boiling point greater than about 100° C.; and c. not more than one aliphatic carbon-carbon double bond per molecule.

DETAILED DESCRIPTION OF THE INVENTION

The liquids used in the instant invention contain either alcoholic or phenolic hydroxyl groups. The hydroxyl groups of liquids which can be used in this process exhibit a strong tendency to hydrogen bond as donors to other materials. The hydrogen bond donor properties of these liquids can be measured according to the method of Middleton et al. as described in the Journal of American Chemical Society, Vol. 86, page 4950 (1964). Briefly, the method consists of measuring in two solvents at least that part of the infrared absorption spectrum due to OH— stretching which occurs at about from 2.7 to 3.3 microns. The solvents used are carbon tetrachloride, in which the OH group is unbonded to the solvent and tetrahydrofuran to which liquids used in the invention bond with resultant absorption at a longer wavelength. The liquids used in this invention show maximum absorption at wavelengths in tetrahydrofuran at least about 0.2 microns longer than in carbon tetrachloride. Hydroxy compounds with a difference in OH stretching wavelength between tetrahydrofuran and carbon tetrachloride of less than about 0.2 microns may lack sufficient —OH bonding strength and therefore fail to break the gel into the desired small fragments. Simple aliphatic alcohols, ethylene glycol or triethylene glycol, for example, exhibit an OH stretching wavelength difference of less than that required, and are not suitable for use in the instant invention.

The liquids used in the present process should have a boiling point greater than about 100° C. Because of the faster breakdown of the gel obtainable with higher boiling liquids, it is preferred to use liquids having boiling points of at least about 175° C. For practical reasons, it is preferred to use materials having melting points no higher than about 175° C.

The liquids used in the instant process can have not more than one aliphatic carbon-carbon double bond. While the reason for the unsatisfactory performance of other compounds is not fully understood, it is believed that increased levels of unsaturation may have reduced permeation rates in the polyamide gels that adversely effect their performance in breaking down the gels.

A wide variety of known liquids satisfy the requirements of the instant process. A preferred group of compounds having at least one alcoholic hydroxy group have the general formula $RC(CF_3)_2OH$ wherein R is a hydrocarbon moiety of up to about 20 carbon atoms, unsubstituted or substituted with radicals such as halide, hydroxy, ether, alkyl, and amino groups. Those compounds having a phenolic hydroxyl group include those of the general formula $C_6R'_5OH$, wherein the R' groups are independently selected from hydrogen, halide, —$NO_2$ and lower alkyl of from 1–4 carbon atoms. Preferred aromatic compositions include those of the general formula $ArC(CF_mCl_n)_2OH$, in which Ar is an unsubstituted aromatic radical or an aromatic radical substituted with hydroxyl or halogen, the $m$ and $n$ are integers, the sum of which is 3 and $n$ is equal to 1 or 0, and the two parenthecated groups are the same or different. Particularly satisfactory compositions in the instant process have been found to include 1,1-bis(trifluoromethyl)heptadecanol ($C_{16}H_{33}C[CF_3]_2OH$), 2-hydroxy-d,a-bis(trifluoromethyl)benzylalcohol (2-$OHC_6H_4C[CF_3]_2OH$) and 3,4-dichloro-α,α-bis(trifluoromethyl) benzylalcohol (3,4-$[Cl]_2C_6H_3C[CF_3]_2OH$), of which the lattermost has been found to be particularly effective. Accordingly, it is preferred that the hydroxyl-containing liquid comprise a major portion of at least one of these compounds, that is, at least about 50% by weight.

In removing polyamide gel from process equipment, the quantity of hydroxyl-containing liquid used will vary widely, according to the configuration of the process equipment being treated. In general, the hydroxyl-containing liquid is applied in an amount sufficient to contact all deposits of the gel and at a temperature within the specified range. Polyamide dissolved by the hydroxyl-containing liquid markedly increases the viscosity of the liquid, thereby decreasing its ability to permeate and break up the gel. The concentration of the polyamide dissolved in the hydroxyl-containing liquid should be maintained at a level sufficiently low to permit satisfactory circulation or spraying of the hydroxyl-containing liquid. Concentrations of dissolved polyamide of less than about 10% are generally satisfactory, the concentration being controlled by the addition of fresh hydroxyl-containing compound.

While a variety of pressure conditions can be used in the instant process, excellent results are obtained at atmospheric pressure, and such treatment is often preferred for convenience and economy. When rapid treatment of equipment is desired, elevated pressures within the design pressures of the apparatus can be used. Typical elevated pressures are up to about 100 psig.

The most convenient method of applying the liquids used in the instant process to the polyamide gels is direct contact of the gels by circulation of the liquid through the process equipment or by spraying the liquid on all surfaces to be cleaned. Most compounds are particularly effective in the instant invention when maintained at about their normal boiling point, ± 20 C.°. Other techniques which increase the contact of fresh liquid with the gel can also be used, including, for example, ultrasonic agitation, stirring and boiling. Some polyamide gels can be effectively treated using the preferred liquids of the instant process by condensing vapors of the liquid onto the surface of the gel. For example, the gel of nylon 6, the polyamide derived from caprolactam, can be removed by condensing the vapor of 3,4-dichloro-α,α-bis(trifluoromethyl)benzyl alcohol onto the surface of the gel.

After contacting of the gel with the hydroxyl-containing liquid of the instant invention for the required period, subsequent removal of the gel from the process equipment will vary depending on the particular gel as well as the impurities contained in the gel. Particulate matter, for example, may be present in the form of charred polymer or additives incorporated into the polymer mass such as catalyst or pigment. However, in general, draining of the hydroxyl-containing liquid from the system after contacting the gel results in the removal of a major portion of the gel from the equipment. Repetition of the instant process can result in more complete removal of gelled and ungelled polymer, and one such repetition is accordingly preferred.

After treatment according to the instant process, further cleansing is often employed, including steam cleaning, washing with an aqueous surfactant solution and rinses with deionized water. In addition, final rinses with a solvent such as 1,1,2-trichloro-1,2,2-trifluoroethane, alone or in mixture with ethanol or a surfactant such as isopropyl ammonium dodecylbenzenesulfonate can also be used before equipment is returned to service.

The process of the instant invention is effective in the treatment of gels of aliphatic polyamides. The term aliphatic polyamide is used herein in its usual sense, and includes both linear and cyclic aliphatic polymers. Such polyamides include, for example, nylon 6, the polyamide derived from caprolactam, as well as nylon 66, the polyamide of hexamethylenediamine and adipic acid.

The defined liquids, on contacting polyamide gel as described, reduce the particle size of the hard gel and thereafter soften and swell the particles. These swollen particles are easily flushed from the system using the same liquid or a different liquid vehicle. Ungelled polymer is directly dissolved by the liquids used in the process.

Although the mechanism of the invention is not fully understood, it is believed that the hydroxyl-containing liquids permeate the mass of gel in a manner such as to cause uneven swelling, the resultant stresses leading to fracture of the mass into small particles. The particles thereafter swell and soften on continued contact with the liquid. The sequence of fracturing stresses followed by swelling is critical to the success of the instant process. The liquids defined may operate through an ability to rapidly permeate selected areas of the gel mass which, on later swelling of the mass results in the breakdown of the insoluble mass into small granules.

The invention is further illustrated by the following specific examples.

EXAMPLES 1-36

In Examples 1-36, a pipeline gel of nylon 66 was contacted with a hydroxyl-containing liquid as required in the present invention and as indicated in Table 1. The gel was contacted with the liquid at atmospheric pressure and at the temperature indicated, which was frequently the boiling point of the liquid. The contact times used varied from about 15 minutes to about 12 hours.

The hydroxyl-containing liquid was removed and the remaining gel was rated for process effectiveness on a numeric scale of 1-4, in which a rating of 1 indicates that the gel mass was reduced within 15 minutes to particles of coffee grain size or less which were readily flushable, while a rating of 4 indicates that the gel was more slowly fractured and the resulting particles were of larger size so as to render the gel mass barely flushable.

TABLE 1

| Ex. | Compound Formula | Treatment Temp. (C°) | Δλ(u) | Rating |
|---|---|---|---|---|
| 1 | $CCl_3C(CH_3)_2OH\ 2H_2O$ | 113 | 0.20 | 2 |
| 2 | $CH_3CH=CHCH(CF_3)OH$ | 106 | 0.23 | 3 |
| 3 | $CH_3CH=CHC(CF_3)_2OH$ | 97 | 0.39 | 3 |
| 4 | $(CH_3)_2CHCH=CHC(CF_3)_2OH$ | 134 | 0.37 | 3 |
| 5 | $HOC(CF_3)_2(CH_2)_8C(CF_3)_2OH$ | 244 | 0.38 | 4 |
| 6 | $HOC(CF_3)_2(CH_2)_3C(CF_3)_2OH$ | 183 | 0.32 | 3 |
| 7 | $C_8H_{17}C(CF_3)_2OH$ | 140 | 0.32 | 3 |
| 8 | $C_{16}H_{33}C(CF_3)_2OH$ | 185 | 0.29 | 1 |
| 9 | $C_6H_{13}CH=CHC(CF_3)_2OH$ | 175 | 0.31 | 4 |
| 10 | $HOC(CF_3)_2CH=C(CH_3)C(CF_3)_2OH$ (trans-isomer) | 179 | 0.40 | 2 |
| 11 | $HOC(CF_3)_2CH=C(CH_3)C(CF_3)_2OH$ (cis-isomer) | 179 | 0.34 | 3 |
| 12 | $CH_3CH_2CH=CHC(CF_3)_2OH$ | 121 | 0.34 | 4 |
| 13 | $C_6H_6C(CF_3)_2OH$ | 162 | 0.36 | 3 |
| 14 | $C_6H_5C(CF_3)(CF_2Cl)OH$ | 189 | 0.38 | 3 |
| 15 | $C_6H_5C(CF_2CL)_2OH$ | 216 | 0.39 | 4 |
| 16 | $(CH_3)_3CC_6H_4C(CF_3)_2OH$ | 165 | 0.39 | 2 |
| 17 | $3,4\text{-}(CH_3)_2C_6H_3C(CF_3)_2OH$ | 155 | 0.34 | 2 |
| 18 | $4\text{-}BrC_5H_4C(CF_3)_2OH$ | 122 | 0.41 | 2 |
| 19 | $4\text{-}FC_6H_4C(CF_3)_2OH$ | 170 | 0.40 | 2 |
| 20 | $4\text{-}ClC_5H_4C(CF_3)_2OH$ | 180 | 0.40 | 2 |
| 21 | $2\text{-}ClC_6H_4C(CF_3)_2OH$ | 180 | >0.2 | 3 |
| 22 | $3,4\text{-}(Cl)_2C_6H_3C(CF_3)_2OH$ | 215 | 0.41 | 1 |
| 23 | $C_6H_5OC_6H_4C(CF_3)_2OH$ | 209 | 0.36 | 3 |
| 24 | $HOC(CF_3)_2C_6H_4OC_6H_4C(CF_3)_2OH$ | 265 | 0.38 | 4 |
| 25 | $2\text{-}OHC_6H_4C(CF_3)_2OH$ | 200 | >0.2 | 1 |
| 26 | $2,6\text{-}(Cl)_2C_6H_3OH$ | 211 | 0.31 | 3 |
| 27 | $4\text{-}NH_2C_6H_4C(CF_3)_2OH$ | 234 | 0.21 | 4 |
| 28 | $2\text{-}OH,5\text{-}ClC_5H_3C(CF_3)_2OH$ | 239 | >0.2 | 4 |
| 29 | $2\text{-}OH,3\text{-}CH_3,4\text{-}ClC_6H_2C(CF_3)_2OH$ | 243 | >0.2 | 2 |
| 30 | $2\text{-}OH,5\text{-}CH_3C_6H_3C(CF_3)_2OH$ | 234 | >0.2 | 3 |

TABLE 1-continued

| Ex. | Compound Formula | Treatment Temp. (C°) | Δλ(u) | Rating |
|---|---|---|---|---|
| 31 | 2,3-$(CH_3)_2$,6-OH$C_6H_2C(CF_3)_2$OH | — | >0.2 | 4 |
| 32 | 4-$NO_2C_6H_4$OH | 204 | 0.39 | 4 |
| 33 | $C_6H_5$OH | 177 | 0.29 | 3 |
| 34 | 2-Cl$C_6H_4$OH | 183 | 0.29 | 4 |
| 35 | 4-Cl$C_6H_4$OH | 218 | 0.30 | 4 |
| 36 | 3-$CH_3C_6H_4$OH | 196 | 0.28 | 4 |

COMPARATIVE EXAMPLES A – J

In Comparative Examples A–J, a series of compounds was tested according to the procedures of the instant process that failed to satisfy one or more of the requirements for the hydroxyl-containing liquids. Various of these compounds failed to contain the required hydroxyl group, exhibited a normal boiling point of less than 100° C., contained more than one aliphatic carbon-carbon double bond per molecule or exhibited an infrared absorption wavelength difference as defined of less than about 0.2 microns. These compositions, indicated in Table 2, were tested according to the same procedures as the foregoing examples, but all failed to render the gel polyamides flushable, even though many have structures similar to the compounds used in the instant process. The hydroxyl-containing liquid used in Comparative Example A, for example, converted the gel to a rubbery mass but did not reduce the particle size of the mass to permit flushing. The composition of Comparative Example C, which is comparable in structure to the compounds of the invention shown in Examples 2, 3, 4, 9, 10, 11 and 12, fail to either swell or reduce the particle size of the gel mass.

EXAMPLE 37

Process vessels and associated piping coated with nylon 66 and its gel were partially filled with 3,4-$(CL)_2C_6H_3C(CF_3)_2$OH fluid. The amount of fluid introduced was sufficient to maintain the dissolved nylon concentration below about 10% by weight. The fluid was recirculated through the system while being heated to 200° ± 10° C. and held at temperature for 4 hours while continually spraying the exposed vessel surfaced with the fluid. The particulated gel was filtered out of the recirculating fluid. Pressure in the system was adjusted with nitrogen to achieve adequate pressure to the recirculating pump at the desired recirculation rate. The vessel was drained while recirculating and spraying. The cycle was repeated with a fresh charge of the processing fluid.

TABLE 2

| Comparative Ex. | Compound Formula | Treatment Temp. (C°) | Δλ(u) |
|---|---|---|---|
| A | HO$(CH_2CH_2O)_3$H | 285 | — |
| B | $(CF_3)_2$CHOH | 59 | 0.35 |
| C | $(HO(CF_3)_2CCH_2CH=CHCH_2—)_2$ | 225 | 0.33 |
| D | N$(CH_2CH_2OH)_3$ | 265 | — |
| E | 1,2,4-$(Cl)_3C_6H_3$ | 135 | — |
| F | 4-$CH_3C_6H_4C(CF_3)_2NH_2$ | 185 | — |
| G | $CCl_3COCCl_3$ | 206 | — |
| H | HCON$(CH_3)_2$ | 153 | — |
| I | $CH_2$—O—CH_2, C=O (cyclic carbonate) | 197 | — |
| J | $CH_2$—$CH_2$, $CH_2$—C=O, N—$CH_3$ (N-methylpyrrolidone) | 202 | — |

I claim:

1. A process for rendering an aliphatic polyamide gel readily flushed which comprises contacting said gel at a temperature of about from 100° to 300° C and for a period of about from 15 minutes to 12 hours with at least one compound having at least one alcoholic or phenolic hydroxyl group in amounts sufficient to maintain the concentration of dissolved ungelled polyamide below about 10 percent by weight, the compound being liquid at the contact temperature and having:
   a. an infrared absorption characterized by a wavelength difference of at least about 0.2 micron in hydroxyl group stretching frequency when measured in carbon tetrachloride and tetrahydrofuran;
   b. a normal boiling point greater than about 100° C; and
   c. not more than one aliphatic carbon-carbon double bond per molecule.

2. A process of claim 1 wherein the liquid exhibits a normal boiling point of at least about 175° C.

3. A process of claim 1 wherein the compound is an aliphatic compound of the general formula $RC(CF_3)_2$OH, wherein R is a hydrocarbon moiety of up to six carbon atoms, unsubstituted or substituted with radicals of up to six carbon atoms and selected from halide, hydroxy, alkoxy, alkyl and amino.

4. A process of claim 1 wherein the compound is an aromatic compound of the general formula $C_6R_5$OH, wherein the R groups are each independently selected from hydrogen, halide, nitro and lower-alkyl of from 1 to 4 carbon atoms.

5. A process of claim 3 wherein the compound comprises a major portion of 3,4-$(Cl)_2C_6H_3C(CF_3)$OH.

6. A process of claim 3 wherein the compound comprises a major portion of 2-OH$C_6H_4C(CF_3)_2$OH.

7. A process of claim 3 wherein the compound comprises a major portion of $C_{16}H_{33}C(CF_3)_2$OH.

8. A process of claim 1 wherein the polyamide gel is contacted by circulation of the compound through process equipment bearing the gel.

9. A process of claim 1 wherein the polyamide gel is contacted by spraying the compound onto the gel.

10. A process of claim 1 wherein the polyamide gel is contacted by condensing vapors of the compound onto the gel.

11. A process of claim 8 wherein the compound is maintained at about its normal boiling point.

12. A process of claim 1 wherein the compound is selected from the group consisting of:
$CCl_3C(CH_3)_2OH.2H_2O$; $CH_3CH=CHCH(CF_3)OH$;
$CH_3CH=CHC(CF_3)_2OH$;
$(CH_3)_2CHCH=CHC(CF_3)_2OH$;
$HOC(CF_3)_2(CH_2)_8C(CF_3)_2OH$;
$HOC(CF_3)_2(CH_2)_3C(CF_3)_2OH$; $C_8H_{17}C(CF_3)_2OH$;
$C_{16}H_{33}C(CF_3)_2OH$; $C_6H_{13}CH=CHC(CF_3)_2OH$;
trans-$HOC(CF_3)_2CH=C(CH_3C(CF_3)_2OH$; cis- HOC(CF$_3$)$_2$CH=C(CH$_3$)C(CF$_3$)$_2$OH; CH$_3$CH$_2$CH=CHC(CF$_3$)$_2$OH; C$_6$H$_5$C(CF$_3$)$_2$OH; C$_6$H$_5$C(CF$_3$)(CF$_2$Cl)OH; C$_6$H$_5$C(CF$_2$Cl)$_2$OH; (CH$_3$)$_3$CC$_6$H$_4$C(CF$_3$)$_2$OH; 3,4-(CH$_3$)$_2$C$_6$H$_3$C(CF$_3$)$_2$OH; 4-BrC$_6$H$_4$C(CF$_3$)$_2$OH; 4-FC$_6$H$_4$C(CF$_3$)$_2$OH; 4-ClC$_6$H$_4$C(CF$_3$)$_2$OH; 2-ClC$_6$H$_4$C(CF$_3$)$_2$OH; 3,4-(Cl)$_2$C$_6$H$_3$C(CF$_3$)$_2$OH; C$_6$H$_5$OC$_6$H$_4$C(CF$_3$)$_2$OH; HOC(CF$_3$)$_2$C$_6$H$_4$OC$_6$H$_4$C(CF$_3$)$_2$OH; 2-OHC$_6$H$_4$C(CF$_3$)$_2$OH; 2,6-(Cl)$_2$C$_6$H$_3$OH; 4-NH$_2$C$_6$H$_4$C(CF$_3$)$_2$OH; 2-OH,5-ClC$_6$H$_3$C(CF$_3$)$_2$OH; 2-OH,3-CH$_3$,4-ClC$_6$H$_2$C(CF$_2$)$_2$OH; 2-OH,5-CH$_3$C$_6$H$_3$C(CF$_3$)$_2$OH; 2,3-(CH$_3$)$_2$, 6-OHC$_6$H$_2$C(CF$_3$)$_2$OH; 4-NO$_2$C$_6$H$_4$OH; C$_6$H$_5$OH; 2-ClC$_6$H$_4$OH; 4-ClC$_6$H$_4$OH; and 3-CH$_3$C$_6$H$_4$OH.

* * * * *